UNITED STATES PATENT OFFICE.

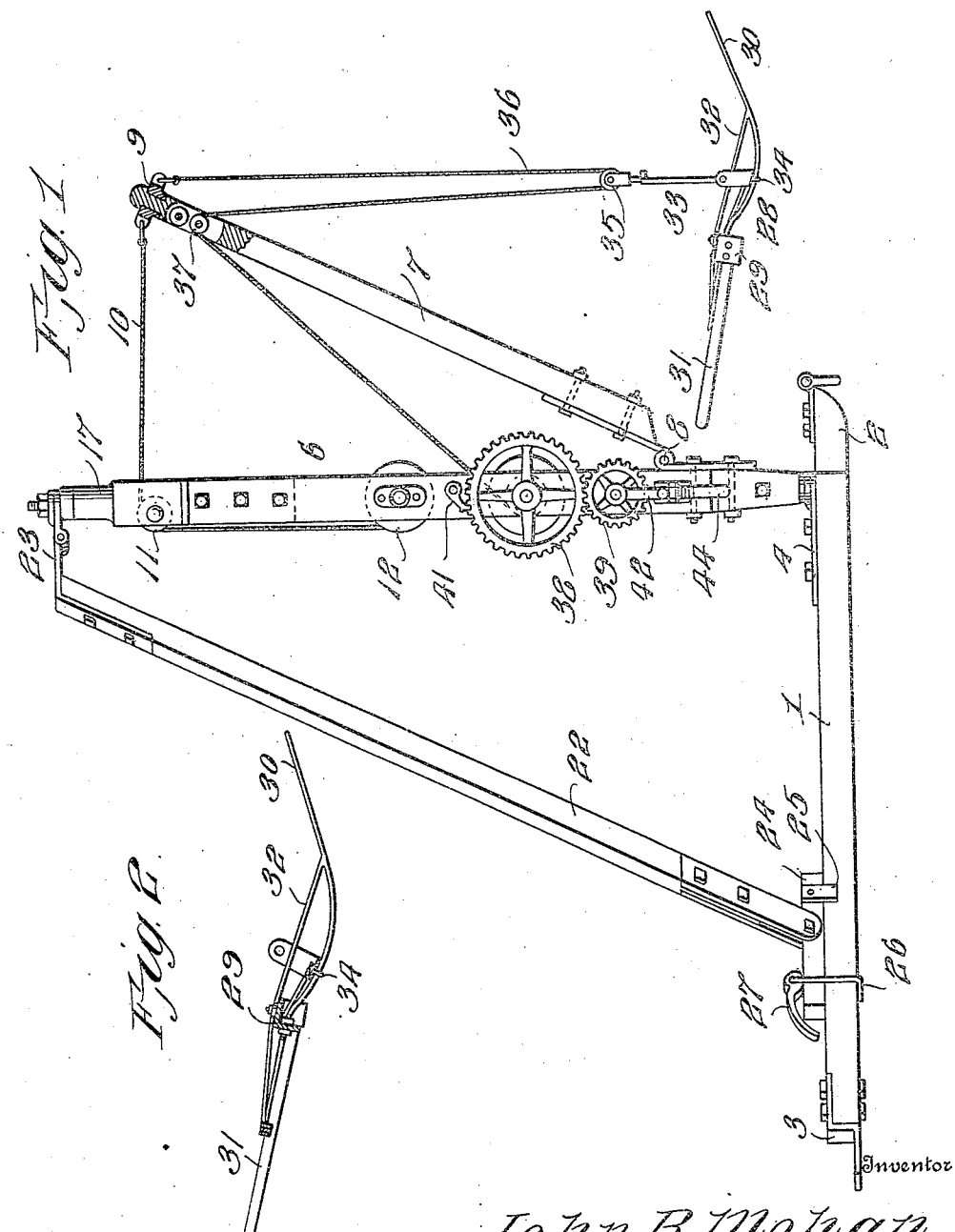

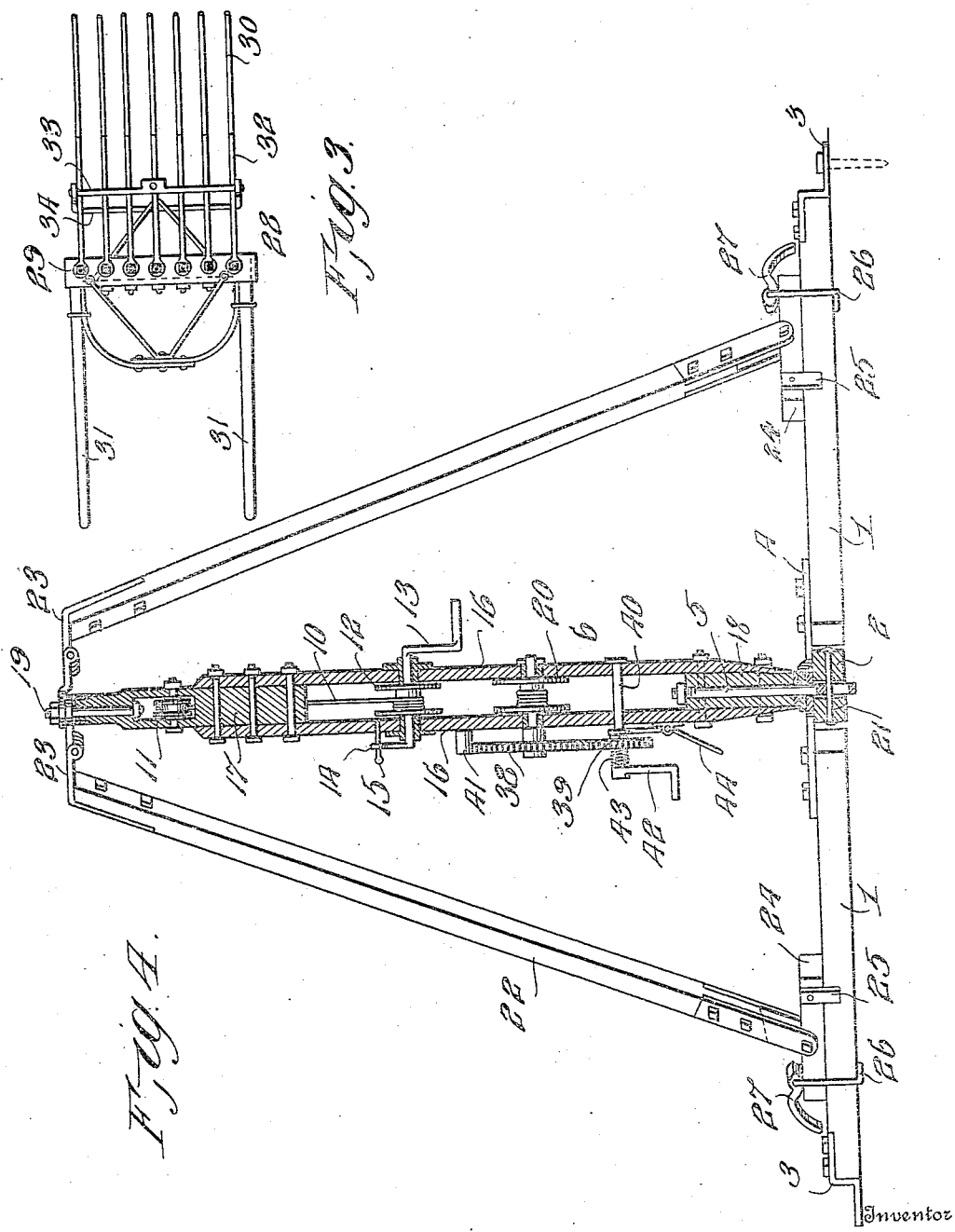

JOHN B. MOHAN, OF EFFINGTON, SOUTH DAKOTA, ASSIGNOR OF ONE-HALF TO CLAUDE F. PEFFER, OF EFFINGTON, SOUTH DAKOTA.

MANURE-LOADER.

935,391.

Specification of Letters Patent. Patented Sept. 28, 1909.

Application filed March 10, 1909. Serial No. 482,427.

*To all whom it may concern:*

Be it known that I, JOHN B. MOHAN, a citizen of the United States, residing at Effington, in the county of Roberts and State of South Dakota, have invented new and useful Improvements in Manure-Loaders, of which the following is a specification.

The primary object of this invention is to provide means specially designed for loading fertilizer such as manure upon farm wagons although it may be used to advantage for loading litter and other material; and it may be likewise adapted for stacking purposes.

In its organization, the device comprises a crane, a supporting base therefor, means for adjusting and plumbing the crane, a fork or load carrier and operating means therefor.

The invention consists of the novel features, details of construction and combinations of parts which hereinafter will be more particularly set forth, illustrated and finally claimed.

Referring to the drawings hereto attached forming a part of this specification: Figure 1 is a side view of a loader embodying the invention, a portion of the boom being broken away. Fig. 2 is a side view of the fork or load carrier on a larger scale. Fig. 3 is a top plan view of the fork. Fig. 4 is a front view of the loader, the post of the crane being in vertical section.

The base comprises sills 1 and a draft timber 2. The sills are rearwardly diverged and the draft timber 2 is arranged between the front ends of the sills and receives the clevis or other device by means of which the draft may be applied thereto. Angle irons 3 are secured to the rear ends of the sills 1 and their projecting ends are apertured to receive pins for securing the loader in the located position. Strap irons 4 are secured to the front ends of the sills 1 and their ends overlap and are apertured to receive a vertical pin or journal 5. It will be understood that the sills 1 may be adjusted to any angle or turned so as to lie parallel thereby reducing the width of the machine for storage or to admit of the same being readily transported over the ground. Any suitable means may be employed for holding the sills 1 spread at the required angle.

The crane comprises a post 6 and a boom 7 the latter being pivoted at 8 to the post near its lower end. The boom may be adjusted to any angle and is provided at its free end with a swivel 9 to which a rope or cord 10 is connected, said rope or cord passing over a guide pulley 11 near the upper end of the post and thence extending downward and connected to a drum 12 upon which it is adapted to wind. An operating crank 13 is connected with the drum 12 and affords convenient means for winding the rope or cord 10 thereon. Any means may be employed for holding the drum 12 so as to prevent the rope or cord 10 from unwinding and thereby secure the boom 7 in the adjusted position. As shown an arm 14 is fast to the shaft of the drum 12 and is adapted to be engaged by means of a pin 15 let into an opening formed in the post.

The post 6 comprises companion members 16 which are transversely spaced and filling pieces 17 and 18 secured between the end portions of the members 16 to properly space the same. The lower filling piece 18 consists of a block which is formed with a vertical opening to receive the pin or journal 5. The upper filling piece 17 projects above the members 16 and is apertured to receive the guide pulley 11 and its upper portion is provided with a vertical opening in which is fitted a pin or journal 19. This construction of post provides for receiving the drum 12 and a corresponding drum 20 as well as forming supports for the shafts or journals of the drums at each side thereof. The lower pin or journal 5 is let into an opening of the draft timber 2 and is apertured to receive a transverse pin 21 thereby admitting of the post moving toward and from the perpendicular which is essential when setting the loader to meet certain requirements.

Braces 22 connect the rear ends of the sills 1 with the upper portions of the post 6. The braces 22 have a hinge connection at their upper ends and are adapted to make adjustable connection at their lower ends with the sills 1. Hinge connections 23 connect the upper ends of the braces 22 with the projecting ends of the pin or journal 19, the inner hinge members being apertured to receive the pin 19 and the outer hinge members being bent and secured to the upper ends of the braces 22 in the manner about as shown. This construction admits of the post turning freely about a vertical axis and at the same time being plumbed. Short bars 24 are pivotally connected to the lower ends of the braces 22 and are slidably mounted upon the sills 1 and are adapted to be secured to said sills in the adjusted position. Clips 25 direct the bars 24 in their sliding movement and prevent lateral displacement thereof. For securing the bars 24 in the located position open links 26 are arranged to embrace the parts 24 and 1 and cam levers 27 are mounted thereon. Upon turning the cam levers 27 to release the blocks 24 the latter may be moved upon the sills and upon retightening the cam levers the blocks 24 are secured in the adjusted position.

The fork or load carrier is indicated at 28 and may be of any construction but as shown, comprises a head 29, tines 30, and handle bars 31. The tines are braced as indicated at 32 and suitable braces connect the handle bars with the head. A bail 33 is pivotally connected at its ends to the bent ends of a brace 24 extending beneath the tines 30. A sheave pulley 35 is connected by means of a swivel joint to the bail 33 and is supported in the bight of a rope or cord 36 one end of which is attached to the swivel 9 and the other portion passing over a guide pulley 37 near the upper end of the boom 7 thence connected to the drum 20 and adapted to wind thereon.

A gear wheel 38 is fast to the projecting end of the shaft or journal of the drum 20 and is adapted to mesh with a gear wheel 39 mounted upon a shaft 40 so as to turn therewith and slide thereon. A pawl 41 coöperates with the teeth of the gear wheel 38 to prevent backward rotation thereof. A crank 42 is fitted to the shaft 40. The gear wheel 39 is slidable upon the shaft 40 and is normally pressed inward by means of a spring 43. A lever 44 is adapted to be operated by the foot to press the gear wheel 39 outward to clear the gear wheel 38 when it is required to admit of the fork or load carrier 28 descending rapidly after discharging its load.

From the foregoing it will be understood that the invention provides a loading device which may be adapted for general use either for loading compost, manure or like fertilizer into a wagon or for stacking or for lifting loads generally, the construction being such as to admit of easily and quickly plumbing the crane, moving the device from place to place and reducing the same to compact form for storing or when not required for immediate service.

Having thus described the invention what is claimed is:—

1. In a loader of the character described, the combination of sills pivotally connected at one end, a post mounted upon the pivoted ends of the sills, braces having a hinge connection at their upper ends to the upper end of the post and means for adjustably connecting the lower ends of the braces to said sills.

2. In a loader of the character set forth, the combination of sills pivotally connected at one end, a post mounted upon the sills to turn about a vertical axis, braces, hinge connections between the upper ends of the braces and the upper end of the post, short bars pivotally connected to the lower ends of the braces and slidable upon the sills, means for directing the short bars in their sliding movement, and means for securing the short bars to the sills in an adjusted position.

3. In combination, a draft timber, sills pivotally connected at one end to each other and to said draft timber, a vertical journal pivotally connected at its lower end to the draft timber, a post mounted upon said vertical journal and having a vertical journal at its upper end, braces, hinge connections attached to the upper ends of said braces and having corresponding members overlapped and provided with openings to receive said upper vertical journal, and means for adjustably connecting the lower ends of the braces to the said sills.

In testimony whereof I affix my signature in presence of two witnesses.

JOHN B. MOHAN.

Witnesses:
H. A. HELEY,
C. L. OLIVER.

It is hereby certified that in Letters Patent No. 935,391, granted September 28, 1909, upon the application of John B. Mohan, of Effington, South Dakota, for an improvement in "Manure-Loaders," an error appears requiring correction, as follows: In the grant and in the heading of the printed specification it is stated that said Mohan assigned one-half of his right to Claude F. Peffer, whereas it should have been stated that said Mohan assigned *one-fourth of his right to said Claude F. Peffer*, as shown by the record of assignments in this office; and that the said Letters Patent should be read with this correction therein that the same may conform to the record of the case in the Patent Office.

Signed and sealed this 4th day of January, A. D., 1910.

[SEAL.]
C. C. BILLINGS,
*Acting Commissioner of Patents.*